(12) United States Patent
Kawai et al.

(10) Patent No.: US 12,277,521 B2
(45) Date of Patent: Apr. 15, 2025

(54) INFORMATION PROCESSING APPARATUS, WORK MANAGEMENT SYSTEM, AND WORK MANAGEMENT METHOD

(71) Applicant: HONDA MOTOR CO., LTD., Tokyo (JP)

(72) Inventors: Takayuki Kawai, Wako (JP); Makoto Yamamura, Wako (JP); Masaya Honji, Wako (JP); Tsukasa Sugino, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 410 days.

(21) Appl. No.: 17/569,601

(22) Filed: Jan. 6, 2022

(65) Prior Publication Data
US 2022/0222605 A1 Jul. 14, 2022

(30) Foreign Application Priority Data
Jan. 12, 2021 (JP) .................. 2021-003008

(51) Int. Cl.
*G06T 7/00* (2017.01)
*G06Q 10/0639* (2023.01)
*A01D 34/00* (2006.01)
*A01D 101/00* (2006.01)
*H04L 67/12* (2022.01)

(52) U.S. Cl.
CPC ..... *G06Q 10/06398* (2013.01); *G06T 7/0002* (2013.01); *A01D 34/008* (2013.01); *A01D 2101/00* (2013.01); *G06T 2207/30188* (2013.01); *G06T 2207/30232* (2013.01); *H04L 67/12* (2013.01)

(58) Field of Classification Search
CPC .............. A01D 34/008; A01D 2101/00; A01D 34/006; G06T 2207/30188; G06T 2207/30232; G06T 7/0002; G06V 20/56
See application file for complete search history.

(56) References Cited

U.S. PATENT DOCUMENTS

| | | | |
|---|---|---|---|
| 2013/0006419 A1* | 1/2013 | Bergstrom | G05D 1/0278 700/245 |
| 2016/0157422 A1* | 6/2016 | Köhler | A01G 25/09 700/275 |
| 2018/0000025 A1 | 1/2018 | He et al. | |
| 2019/0230850 A1* | 8/2019 | Johnson | A01D 75/006 |

(Continued)

OTHER PUBLICATIONS

Galceran, Enric, and Marc Carreras. "A survey on coverage path planning for robotics." Robotics and Autonomous systems 61.12 (2013): 1258-1276. (Year: 2013).*

(Continued)

*Primary Examiner* — Li Liu
(74) *Attorney, Agent, or Firm* — Thomas | Horstemeyer, LLP

(57) ABSTRACT

An information processing apparatus manages work performed in a work region. An acquisition unit acquires information regarding a work result of the work region. An evaluation unit evaluates work performed in the work region based on the information acquired by the acquisition unit. An identifying unit identifies a work subject that has performed work in a region for which an evaluation is performed by the evaluation unit.

12 Claims, 7 Drawing Sheets

(56) References Cited

U.S. PATENT DOCUMENTS

2019/0320580 A1* 10/2019 Haneda ................ A01D 34/008

OTHER PUBLICATIONS

Patterson, Albert E., Yang Yuan, and William R. Norris. "Development of user-integrated semi-autonomous lawn mowing systems: a systems engineering perspective and proposed architecture." AgriEngineering 1.3 (2019): 453-474. (Year: 2019).*

Daniyan, Ilesanmi, et al. "Development and performance evaluation of a robot for lawn mowing." Procedia Manufacturing 49 (2020): 42-48.*

* cited by examiner

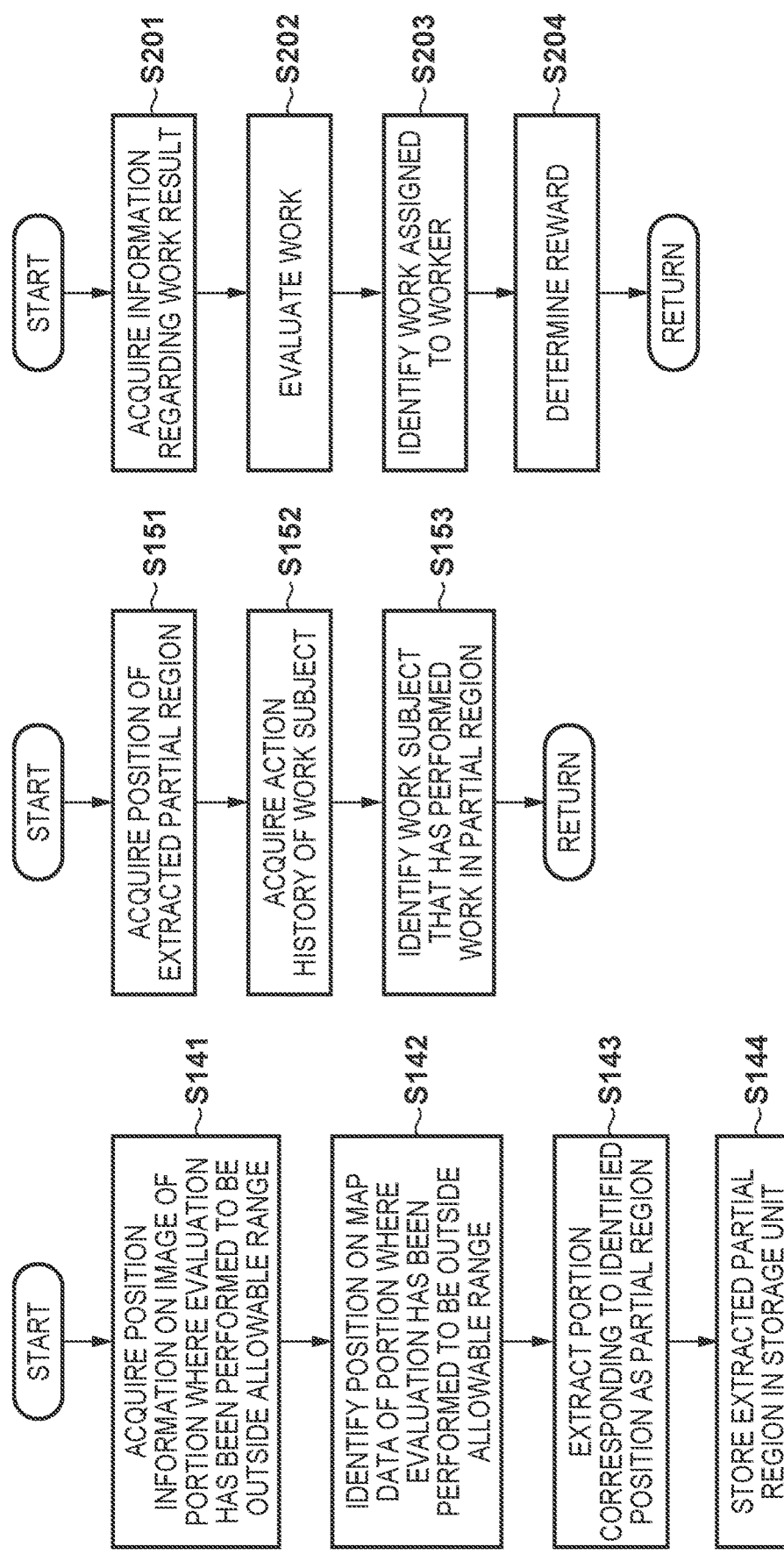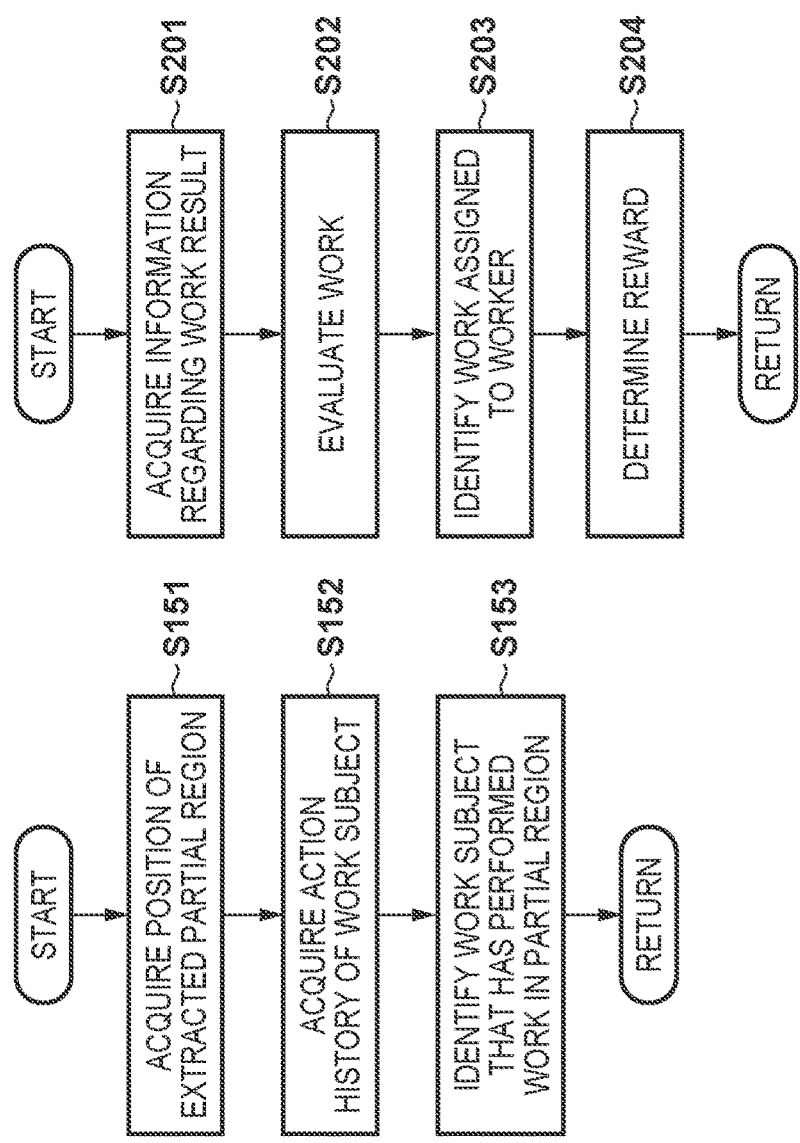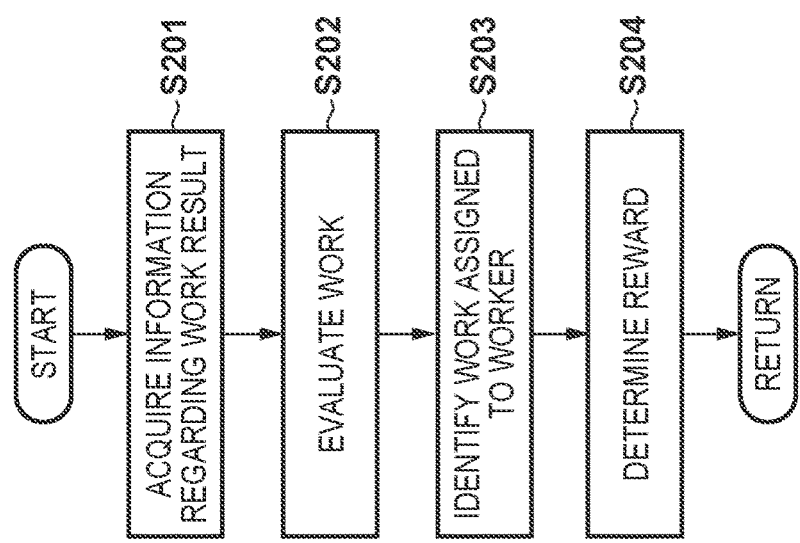

INFORMATION PROCESSING APPARATUS, WORK MANAGEMENT SYSTEM, AND WORK MANAGEMENT METHOD

CROSS-REFERENCE TO RELATED APPLICATION(S)

This application claims priority to and the benefit of Japanese Patent Application No. 2021-003008 filed on Jan. 12, 2021, the entire disclosure of which is incorporated herein by reference.

BACKGROUND OF THE INVENTION

Field of the Invention

The present invention relates to an information processing apparatus, a work management system, and a work management method.

Description of the Related Art

A technique for managing work by a work machine represented by a lawn mower or the like is known. For example, US-2018-0000025 discloses controlling a device such as a lawn mower, an irrigation device, or the like based on a detection result of a sensor provided in a gardening area.

SUMMARY OF THE INVENTION

According to an embodiment of the present invention, an information processing apparatus configured to manage work performed in a work region comprises: an acquisition unit configured to acquire information regarding a work result of the work region; an evaluation unit configured to evaluate work performed in the work region based on the information acquired by the acquisition unit; and an identifying unit configured to identify a work subject that has performed work in a region for which an evaluation is performed by the evaluation unit.

According to another embodiment of the present invention, a work management system comprises: an information processing apparatus configured to manage work performed in a work region; and a communication apparatus provided in a work subject that performs work in the work region and configured to be capable of communicating with the information processing apparatus, wherein the information processing apparatus includes: an acquisition unit configured to acquire information regarding a work result of the work region, an evaluation unit configured to evaluate work performed in the work region based on the information acquired by the acquisition unit; and an identifying unit configured to identify the communication apparatus provided in the work subject that has performed work in a region for which an evaluation is performed by the evaluation unit.

According to still another embodiment of the present invention, a work management method for managing work performed in a work region, comprises: acquiring information regarding a work result of the work region; evaluating work performed in the work region based on the information acquired in the acquiring; and identifying a work subject that has performed work in a region for which an evaluation is performed in the evaluating.

BRIEF DESCRIPTION OF THE DRAWINGS

FIG. 5A is a flowchart illustrating a processing example of the processing unit;

FIG. 5B is a flowchart illustrating a processing example of the processing unit;

FIG. 6 is a flowchart illustrating a processing example of a processing unit;

DESCRIPTION OF THE EMBODIMENTS

Figure 1:
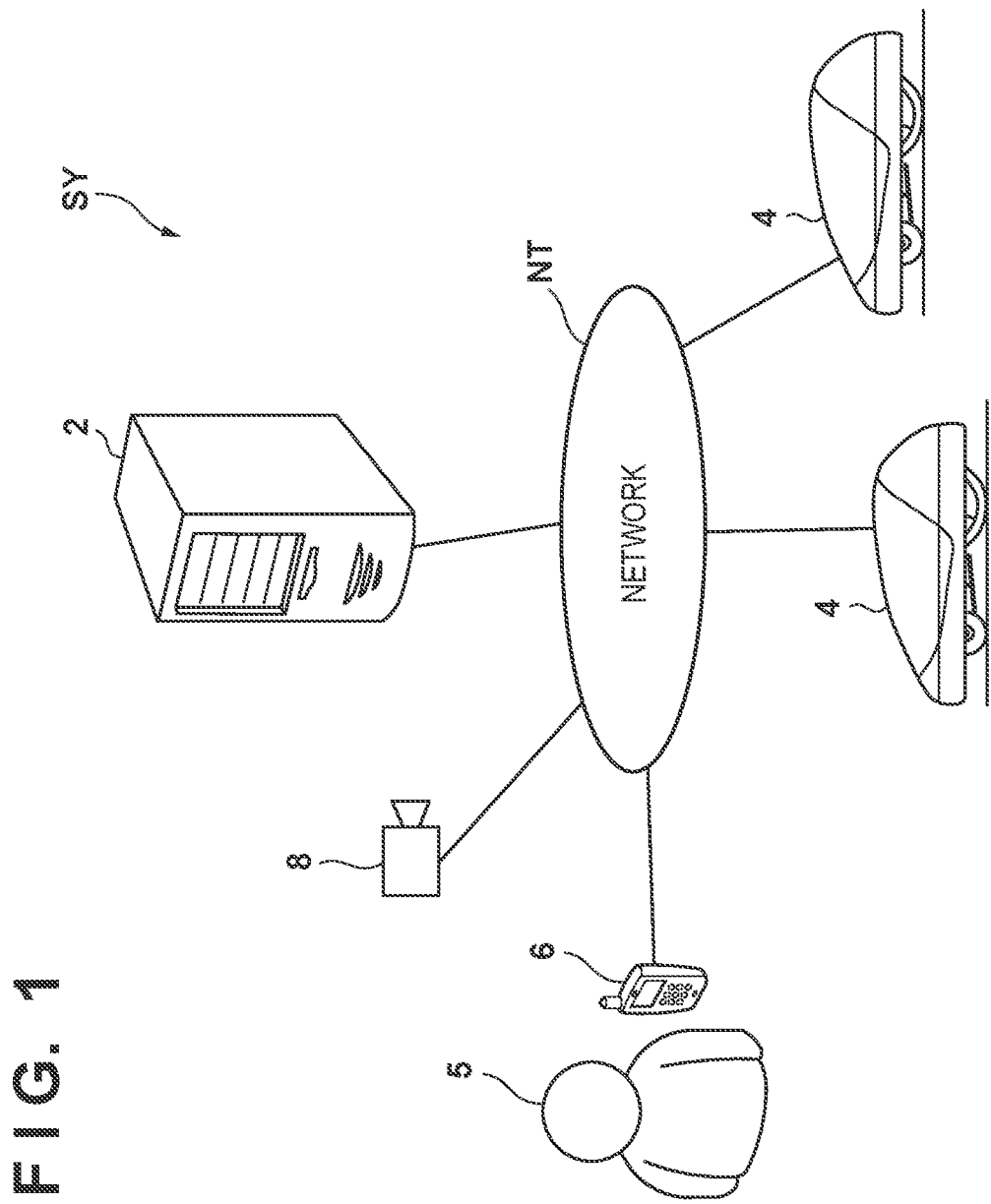
FIG. 1 is a schematic diagram of a work management system according to an embodiment.

In case of managing work by a work subject such as a work machine, a worker, or the like, when a work result by the work subject is not satisfactory, it is desirable to improve the quality of the work to be managed by reflecting the work result in the subsequent work.

Embodiments of the present invention provide a technique for improving the quality of work to be managed.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

<Outline of Work Management System>

FIG. 1 is a schematic diagram of a work management system SY according to an embodiment. The work management system SY is a system that manages work performed in a work region 10 (see FIG. 3) to be described later, and includes an information processing apparatus 2 and at least one communication apparatus provided at a work subject. In the present embodiment, the work management system SY includes a work machine 4 and a terminal apparatus 6 having a function as the communication apparatus. The work machine 4 is a machine that performs a predetermined work in the work region 10, and is an automatic lawn mower in the present embodiment. In addition, the terminal apparatus 6 is a terminal carried by a worker 5 who performs a predetermined work in the work region 10, and may be, for example, a smartphone, a wearable device, or the like. In addition, the work management system SY may include a camera 8 that images the work region 10.

The information processing apparatus 2, the work machine 4, the terminal apparatus 6, and the camera 8 can be configured to be able to communicate with each other via a network NT. In the present embodiment, the network NT is a local area network (LAN), and the information processing apparatus 2 can be installed, for example, in a management facility or the like of the work region 10 provided around the work region 10. Note that the information processing apparatus 2 and the work machine 4, the terminal apparatus 6, and the camera 8 may be connected via an external network such as the Internet. That is, the information processing apparatus 2 may be a web server or the like.

Hardware Configuration

Figure 2:
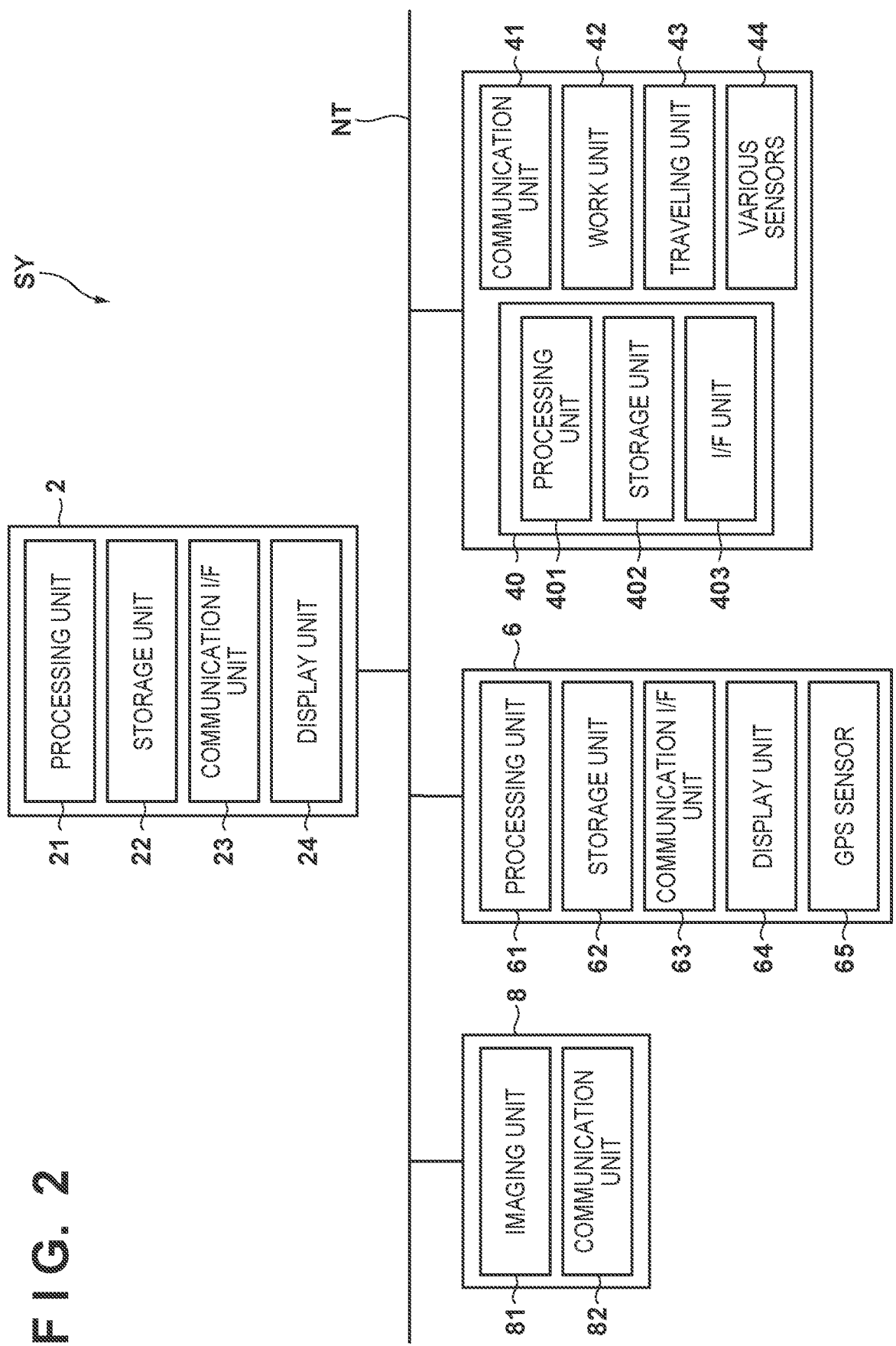
FIG. 2 is a diagram illustrating a configuration example of hardware of the work management system.

FIG. 2 is a diagram illustrating a configuration example of hardware of the work management system SY.

The information processing apparatus 2 manages work performed in the work region 10. In the present embodiment, the information processing apparatus 2 includes a processing unit 21, a storage unit 22, a communication interface (I/F) unit 23, and a display unit 24. The processing unit 21 is a processor, a typical example of which is a central processing unit (CPU), and executes a program stored in the storage unit 22. The storage unit 22 is a random access memory (RAM), a read only memory (ROM), a hard disk drive (HDD), or the like and stores data or the like used for processing by the processing unit 21 in addition to the program executed by the processing unit 21. The communication I/F unit 23 relays transmission and reception of signals between an external device and the processing unit 21. The display unit 24 is, for example, a liquid crystal display, and displays various types of information. In one embodiment, the display unit 24 displays information such as a work result by the work machine 4 and the worker 5, a situation of the work region 10, and the like.

The work machine 4 performs predetermined work and includes a control unit 40, a communication unit 41, a work unit 42, a traveling unit 43, and various sensors 44.

The control unit 40 controls each component of the work machine 4 and includes a processing unit 401, a storage unit 402, and an I/F unit 403. The processing unit 401 is a processor, a typical example of which is a CPU, and executes a program stored in the storage unit 402. The storage unit 402 is a RAM, a ROM, or the like and stores data or the like used for processing by the processing unit 401 in addition to the program executed by the processing unit 401. The I/F unit 403 includes, for example, an I/O interface, and relays transmission and reception of signals between the processing unit 401 and each unit of the work machine 4. The communication unit 41 performs communication with the information processing apparatus 2 or the like which is an external device.

The work unit 42 performs various types of work. In the present embodiment, the work unit 42 may include a blade for cutting grass and an electric motor for rotationally driving the blade. The traveling unit 43 is responsible for the traveling drive of the work machine 4 and may include, for example, wheels and an electric motor for driving the wheels. Since a well-known technique can be appropriately employed for these configurations, a detailed description thereof will be omitted.

The various sensors 44 detect various types of information. Examples of the various sensors 44 include a current sensor for detecting a load of the electric motor of the work unit 42 or the traveling unit 43, an infrared sensor or a camera for detecting an obstacle in the surroundings, and the like. Furthermore, the various sensors 44 may include a global positioning system (GPS) sensor that acquires position information of the work machine 4. In addition, in a case where a wire is arranged at a boundary (see FIG. 3) of the work region 10 to be described later or each of assigned regions 1011, 1012, and 1021 to be described later, sensors that recognize these boundaries may be included in the various sensors 44. The sensor in this case may be a magnetic sensor that detects a magnetic field generated by alternating current flowing through the wire.

In the present embodiment, the control unit 40 executes autonomous control of the work machine 4. For example, the control unit 40 receives a work plan from the information processing apparatus 2, and performs the work based on the received work plan. The work plan may include, for example, a traveling route, a traveling speed, a rotation speed of the blade for cutting grass, and the like at the time of work.

The terminal apparatus 6 may include a processing unit 61, a storage unit 62, a communication I/F unit 63, a display unit 64, and a GPS sensor 65. The processing unit 61 is a processor, a typical example of which is a CPU, and executes a program stored in the storage unit 62. The storage unit 62 is a RAM, a ROM, or the like and stores data or the like used for processing by the processing unit 61 in addition to the program executed by the processing unit 61. The communication I/F unit 63 relays transmission and reception of signals between the processing unit 61 and an external device. The GPS sensor 65 acquires the current position of the terminal apparatus 6.

The camera 8 includes an imaging unit 81 and a communication unit 82. The imaging unit 81 images the work region 10. The communication unit 82 performs communication with an external device and transmits an image captured by the imaging unit 81 to the information processing apparatus 2. In one embodiment, the camera 8 may be a surveillance camera or the like provided in the work region 10 or around the work region 10.

Description of Work Region

Figure 3:
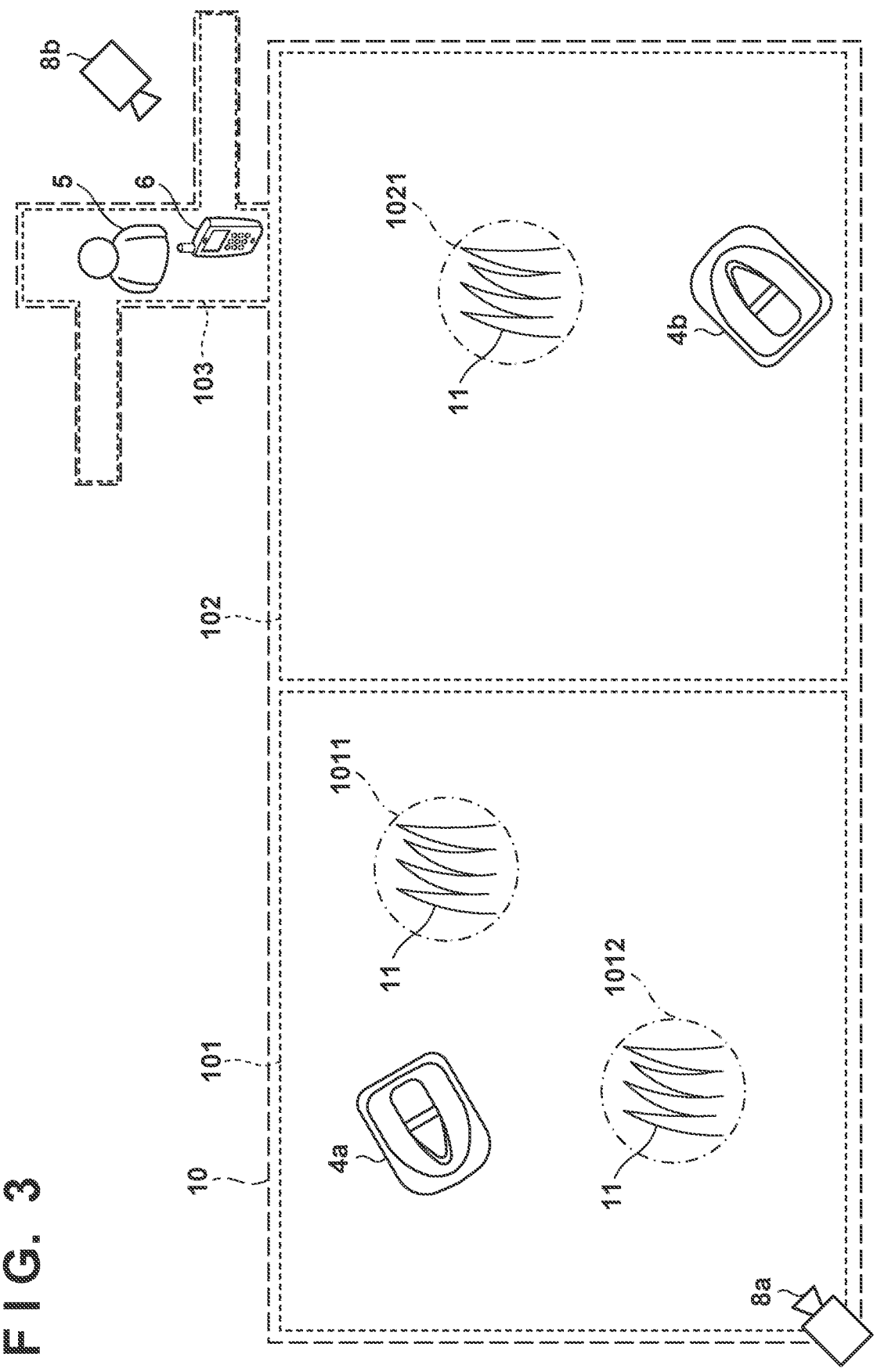
FIG. 3 is an explanatory view of a work region.

FIG. 3 is an explanatory view of the work region 10. The work region 10 is a region where predetermined work is performed, and in the present embodiment, lawn mowing work is performed. Examples of the work region 10 where the lawn mowing work is performed include a garden of a house, a park, a square, a golf course, and the like. Note that a wire defining a boundary may be arranged at a boundary between the work region 10 and another region or a boundary between each of pairs of the assigned regions 1011, 1012, and 1021 described late.

In the present embodiment, two work machines 4a and 4b and one worker 5 perform work in the work region 10. Note that, in the following description, the work machine 4a and the work machine 4b may be collectively referred to as the work machine 4.

The work region 10 is divided into an assigned region 101 in which the work machine 4a is assigned to work, an assigned region 102 in which the work machine 4b is assigned to work, and an assigned region 103 in which the worker 5 is assigned to work. The assigned regions 101 to 103 can be determined, for example, in a work plan for the work region 10 planned by the information processing apparatus 2. In the example of FIG. 3, the worker 5 is assigned to work in the assigned region 103 where it is difficult for the work machine 4 to perform work due to the intricate portion, and the work machines 4a and 4b are assigned to work in the assigned regions 101 and 102 which are regions having a relatively simple shape.

Note that the assigned regions 101 to 103 can be set as appropriate. For example, at least a part of the assigned regions 101 to 103 may be set to overlap each other. In addition, the work to which each work subject is assigned may be appropriately changed. For example, when the work of the work machine 4a is delayed due to the influence of an obstacle or the like, the work machine 4b may be assigned to a part of the work in the assigned region 101. In addition, the worker 5 may be assigned to the work at portions where incomplete mowing by the work machine 4 is likely to occur, such as corners of the assigned regions 101 and 102 and the like.

In addition, FIG. 3 illustrates partial regions 1011, 1012, and 1021 in the work region 10. The partial regions 1011, 1012, and 1021 are regions partially extracted from the work region 10. In the example of FIG. 3, portions including incomplete mowing 11 are extracted as the partial regions 1011, 1012, and 1021. Hereinafter, the partial regions 1011, 1012, and 1021 may be collectively referred to as a partial region 1011 and the like.

In addition, two cameras 8a and 8b for imaging the work region 10 are provided around the work region 10. The camera 8a mainly images the assigned region 101. The camera 8b mainly images the assigned regions 102 and 103. Note that, in the following description, the cameras 8a and 8b may be collectively referred to as a camera 8.

In the present embodiment, the information processing apparatus 2 stores map data for the work region 10 in the storage unit 22. For example, in the map data, latitude/longitude information may be associated with each position on the work region 10. In addition, for example, in the map data, coordinate information of a local coordinate system having a predetermined position as a reference point may be associated with each position on the work region 10.

In addition, the information processing apparatus 2 may be able to associate a position on an image captured by the camera 8 with a position on the map data. For example, the storage unit 22 may store information in which coordinates on map data is associated with coordinates on an image captured by the camera 8. By using this information, the processing unit 21 can acquire a position, on the map data of an object on the image captured by the camera 8.

Processing Example 1

Figure 4:
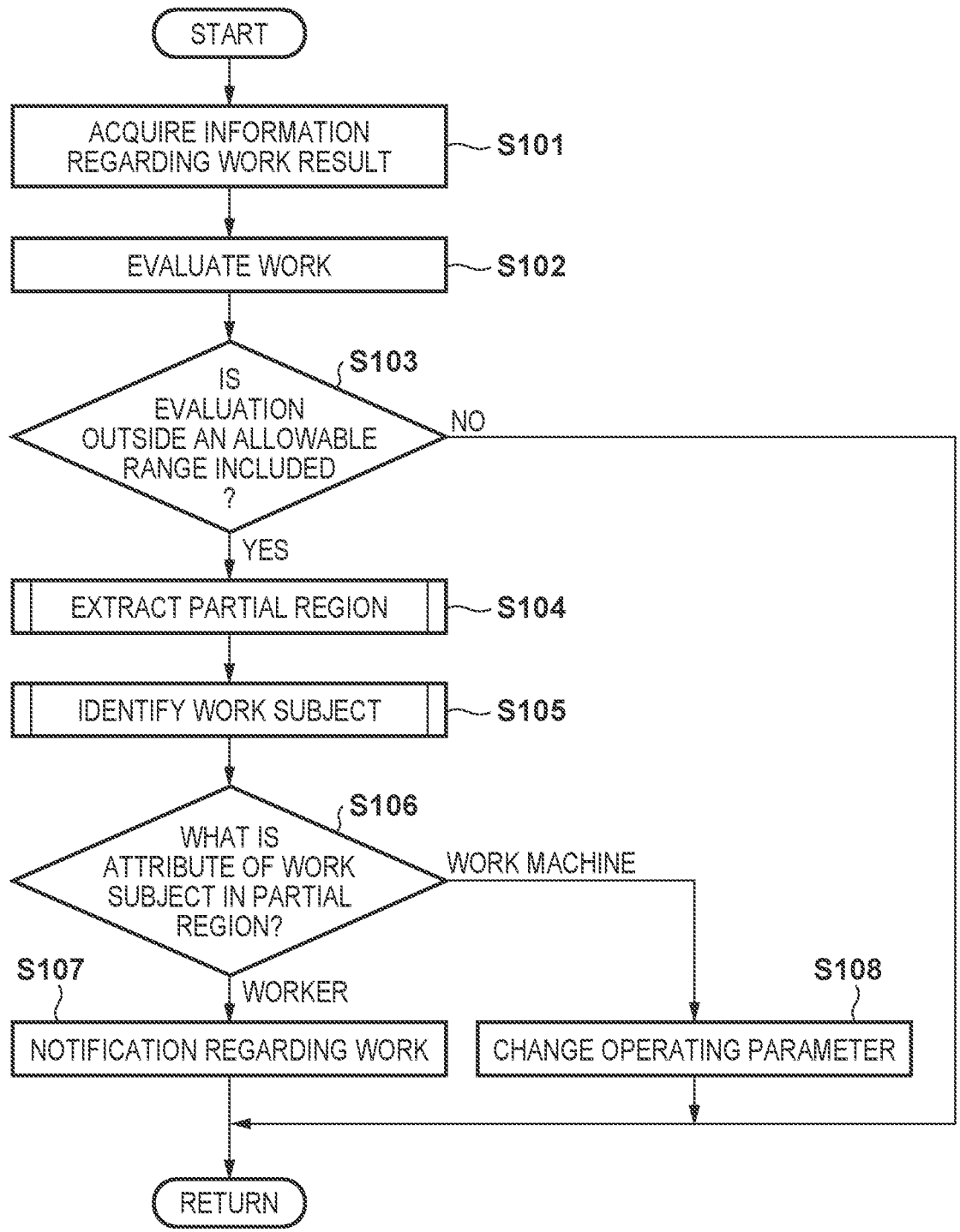
FIG. 4 is a flowchart illustrating a processing example of a processing unit.

FIG. 4 is a flowchart illustrating a processing example of the processing unit 21. This flowchart is for feeding back a work result of the work subject (the work machine 4 or the worker 5) to subsequent work. For example, this flowchart is executed at a predetermined timing after the work is performed by the work subject.

In step S101 (hereinafter, it is simply referred to as S101, and other steps are similarly referred), the processing unit 21 acquires information regarding a work result of the work region 10. In the present embodiment, the processing unit 21 acquires an image of the work region 10 as information regarding the work result. Furthermore, the processing unit 21 receives an image captured by the camera 8 provided so as to be able to image the work region 10 via the communication I/F unit 23.

In S102, the processing unit 21 evaluates the work performed in the work region 10 based on the information regarding the work result acquired in S101. For example, the processing unit 21 performs image processing on the image captured by the camera 8 and acquired in S101 to determine the presence or absence of the lawn or determines the height of the lawn by extracting an edge of the lawn. Then, based on the processing result, the processing unit 21 evaluates work performed by the work subject based on whether there is no incomplete mowing, whether the height of trimmed lawn grass is uniform, whether there is no part where the lawn has grown out, or the like.

Note that the evaluation in S102 may be performed on the entire work region 10 or may be performed on a portion of the work region 10 where the information regarding the work result has been acquired. In addition, the evaluation result may be binary such as whether or not the work result is within an allowable range or good/poor, or may be stepwise such as a score of the work result.

In addition, the processing unit 21 may divide the work region 10 included in the image captured by the camera 8 into an appropriate number of sections, perform an evaluation for each section, and store the evaluation result and the position information of the section on the captured image in the storage unit 22 in association with each other. Alternatively, the processing unit 21 may store the evaluation result and the position information of the evaluated portion on the captured image in association with each other in the storage unit 22 only in a case where negative evaluation is made, such as incomplete mowing or the like.

Figure 9:
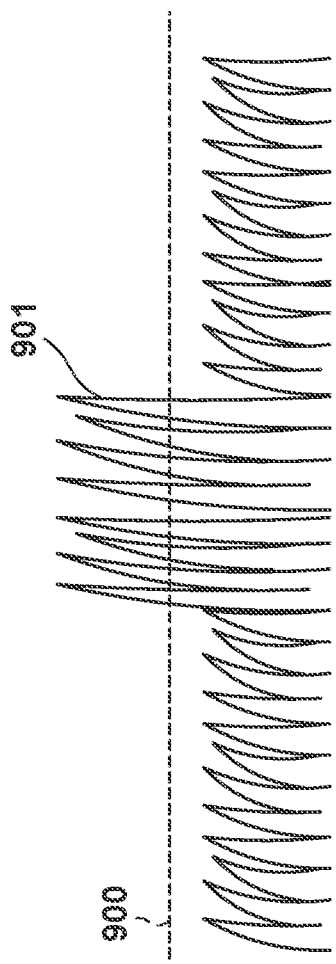
FIG. 9 is a diagram illustrating an example of an image used for work evaluation.

FIG. 9 is a diagram illustrating an example of an image used for the work evaluation. For example, the processing unit 21 extracts a region where the height of the lawn can be detected from the image acquired in S101, and extracts the edge of the lawn to acquire an image for the evaluation as illustrated in FIG. 9. Then, in a case where there is lawn 901 having a height exceeding a reference value 900 based on such an image, the processing unit 21 may determine that the work result is outside the allowable range for that portion. Note that the reference value 900 may be an absolute reference such as a height or the like, or may be a relative reference such as a difference from the height of the surrounding lawn, or the like.

In S103, the processing unit 21 checks whether or not the evaluation in S102 includes an evaluation outside the allowable range, proceeds to S104 in a case where the evaluation outside the allowable range is included, and ends the flowchart in a case where the evaluation is not included. Note that, in a case where the evaluation result in S102 is not binary but is stepwise such as a score, the processing unit 21 may determine that the evaluation result that does not meet the predetermined reference value to be the evaluation outside the allowable range.

In S104, the processing unit 21 extracts the partial region 1011 and the like. In the present embodiment, the processing unit 21 extracts, as the partial region 1011 and the like, a region for which the evaluation is performed to be outside the allowable range is performed in S102 out of the work region 10. A specific example of extracting the partial region 1011 and the like will be described with reference to FIGS. 3 and 5A. FIG. 5A is a flowchart illustrating a specific example of processing in S104.

In step S141, the processing unit 21 acquires position information, on the image captured by the camera 8, of the portion where the evaluation has been performed to be outside the allowable range in step S102. In the example illustrated in FIG. 3, the processing unit 21 acquires coordinate information of three portions of the incomplete mowing 11 in the image captured by the camera 8. Here, in a case where the position information on the captured image corresponding to the evaluation result is stored in the storage unit 22 in association with each other, the processing unit 21 may acquire the coordinate information of the incomplete mowing 11 based on the information.

Note that, although it has been described above that the processing unit 21 acquires the coordinate information of the three portions of incomplete mowing 11, in a case where there is a plurality of portions where the evaluation is performed to be outside the allowable range, the processing unit 21 may repeat the flowchart of FIG. 5A for each portion.

For example, the processing unit 21 may acquire coordinate information of one portion of incomplete mowing 11 and proceed to S142.

In S142, the processing unit 21 identifies the position of the portion where the evaluation has been performed to outside the allowable range on the map data of the work region 10. For example, the processing unit 21 acquires coordinates of the incomplete mowing 11 on the map data based on, for example, information stored in the storage unit 22 in which coordinates on the image captured by the camera 8 are associated with coordinates on the map data.

In S143, the processing unit 21 extracts a portion corresponding to the position identified in S143 as the partial region 1011 and the like. For example, the processing unit 21 extracts, as the partial region 1011 and the like, a portion corresponding to the coordinates of the incomplete mowing 11 on the map data acquired in S142, or a portion including a certain range around the portion. In S144, the processing unit 21 stores the extracted partial region in the storage unit 22 and ends the flowchart.

Note that, in a case where the coordinate information of one portion of incomplete mowing 11 is acquired in S141 and the processing proceeds to S142, the processing unit 21 may check, after the processing of S144, whether or not there is a portion which has been evaluated to be outside the allowable range and from which the partial region 1011 or the like has not been extracted. Then, in a case where there is a portion which has been evaluated to be outside the allowable range and from which the partial region 1011 or the like has not been extracted, the processing may be returned to S141 to repeat the processing.

In S105, the processing unit 21 identifies a work subject. Furthermore, the processing unit 21 identifies a work subject that has performed the work evaluated to be outside the allowable range. FIG. 5B is a flowchart illustrating a specific example of processing of S105. Hereinafter, a case where the work subject of the partial region 1011 is identified will be described as an example. However, the processing unit 21 may also perform processing on other partial regions 1012 and 1021 in each step.

In S151, the processing unit 21 acquires the position of the extracted partial region 1011. For example, the processing unit 21 acquires the position information of the partial region 1011 by reading the information regarding the partial region 1011 stored in the storage unit 22.

In S152, the processing unit 21 acquires an action history of the work subject that has performed work in the work region 10. In the present embodiment, the processing unit 21 acquires action histories of the work machines 4a and 4b and the worker 5. The action history of the work machine 4 may be, for example, information regarding a movement route of the work machine 4 based on a detection result of the GPS sensor which is an example of the various sensors 44 included in the work machine 4. In addition, for example, the action history may be information in which the movement route of the work machine 4 is associated with information such as time or the like. In addition, the action history of the worker 5 may be, for example, information regarding a movement route of the worker 5 based on a detection result of the GPS sensor 65.

Note that the work machine 4 and the terminal apparatus 6 may transmit a detection result or the like of the sensor to the information processing apparatus 2 during or after work so that the processing unit 21 can acquire the action history described above.

In S153, the processing unit 21 identifies the work subject that has performed work in the partial region 1011. For example, the processing unit 21 identifies the work subject that has performed work in the partial region 1011 based on the position information of the partial region 1011 and the action history of the work subject. Furthermore, the processing unit 21 identifies the work subject having a history of passing through the partial region 1011 or the periphery thereof as the work subject that has performed work in the partial region 1011.

Note that the processing unit 21 may identify the work subject depending on which work subject's assigned region includes the partial region extracted in S104. In the example illustrated in FIG. 3, the extracted partial regions 1011 and 1012 are included in the assigned region 101 of the work machine 4a, and thus the processing unit 21 may identify the work machine 4a as the work subject for the partial regions 1011 and 1012. In addition, since the extracted partial region 1021 is included in the assigned region 102 of the work machine 4b, the processing unit 21 may identify the work machine 4b as the work subject for the partial region 1021.

However, as described above, since the assigned regions 101 to 103 can be set in advance in the work plan or the like, the work machine 4b may be assigned to a part of the assigned region 101 in a case where, for example, the work of the work machine 4a is delayed. Therefore, by using the identifying method in which the action history of each work subject is taken into consideration, the work subject can be identified more accurately.

In S106, the processing unit 21 checks an attribute of the work subject. The processing unit 21 proceeds to S107 in a case where the attribute of the work subject is the worker 5 and proceeds to S108 when the attribute of the work subject is the work machine 4.

In S107, the processing unit 21 issues a notification regarding the subsequent work to the worker 5. For example, in a case where the information processing apparatus 2 is installed in a management facility or the like provided around the work region 10, the processing unit 21 may issue a notification to the worker 5 by causing the display unit 24 to display the contents of the notification. In addition, for example, the processing unit 21 may transmit notification contents to the terminal apparatus 6 possessed by the worker 5 via the communication I/F unit 23 by an e-mail, a so-called chat application, or the like.

For example, in a case where the evaluation is outside the allowable range due to incomplete mowing, the processing unit 21 may issue a notification instructing to intensively perform work on a region where incomplete mowing has been left. In addition, for example, in a case where the evaluation is outside the allowable range due to variations in the cutting height of the lawn, a notification instructing to perform the work carefully may be issued.

In S108, the processing unit 21 causes the work machine 4 to change an operating parameter. In the present embodiment, the processing unit 21 transmits instructions to change the parameter to the work machine 4 via the communication I/F unit 23.

Examples of the operating parameter include a traveling speed, a rotation speed of a blade for mowing lawn, a traveling route, and the like at the time of work. For example, in a case where the result of the work in the partial region 1011 is evaluated to be outside the allowable range, the processing unit 21 may issue an instruction to change the operating parameter so as to decrease the traveling speed or increase the rotation speed of the blade when working in the partial region 1011. In addition, the traveling route may be changed so as to increase the number of times of passing through the partial region 1011 at the time of work.

According to the present processing example, since the work subject of the evaluated work is identified, it is possible to associate the evaluation of the work with the work subject thereof. By using the relationship between the evaluation and the work subject, it is possible to reflect the evaluation of the work efficiently in the subsequent work to improve the quality of the work performed in the work region 10. In addition, since the feedback of work is performed according to the attribute of the work subject, it is possible to feed the evaluation result back more effectively to the subsequent work.

Processing Example 2

FIG. 6 is a flowchart illustrating a processing example of the processing unit 21. In this flowchart, in a case where the work subject is the worker 5, that is, the work subject is not a machine but a person, a reward for the work is determined. This flowchart is executed, for example, at a predetermined timing after work in the work region 10 is performed.

Here, S201 and S202 are similar to S101 and S102, respectively.

In S203, the processing unit 21 identifies the work assigned to the worker 5 out of the work evaluated in S202. For example, the processing unit 21 acquires the action history of the worker 5 based on a detection result or the like of the GPS sensor 65 of the terminal apparatus 6 and determines in which region of the work region 10 the worker 5 has performed work. Subsequently, the processing unit 21 identifies the work performed by the worker 5 out of the work evaluated in S202. Note that, in a case where all of the work evaluated in S202 is performed by the work machine 4, the processing unit 21 may end this flowchart without performing the subsequent processing.

In S204, the processing unit 21 determines a reward for the worker 5 based on the evaluation result in S202. For example, in a case where the evaluation result includes a negative evaluation such as an incomplete mowing or a variation in the height of the lawn, the processing unit 21 may set the reward for the worker 5 lower than the reference value. On the other hand, for example, in a case where the evaluation result does not include a negative evaluation, or the like, the processing unit 21 may set the reward for the worker 5 to be higher than the reference value.

In addition, in a case where the evaluation result includes information regarding the workload such as the amount of cut lawn or the like, the processing unit 21 may determine the reward according to the workload of the worker 5. For example, the processing unit 21 may acquire images captured by the camera 8 before and after work in S201 and calculate the amount of lawn cut by the worker 5 by comparing results of analyzing images before and after work in S202.

In addition, in a case where the evaluation result includes information regarding weather conditions and the like such as temperature, humidity, and the like at the time of work, the processing unit 21 may determine the reward according to the conditions. For example, even with the same workload, the burden on the worker 5 becomes relatively large in work under adverse conditions such as high temperature, low temperature, rainy weather, and the like. Therefore, the processing unit 21 may raise the reward in such a case. The processing unit 21 may acquire weather conditions or the like from a temperature and humidity meter or the like installed in the work region 10 or the periphery thereof. In addition, the work machine 4 and the terminal apparatus 6 may include a sensor such as a temperature and humidity meter or the like and the detection result may be transmitted to the information processing apparatus 2. In addition, the processing unit 21 may acquire weather information around the work region 10 via the Internet.

As described above, according to the present processing example, since the reward for the worker 5 is determined according to the work performed by the worker 5, it is possible to enhance the motivation of the worker 5.

Other Embodiments

Figure 7:
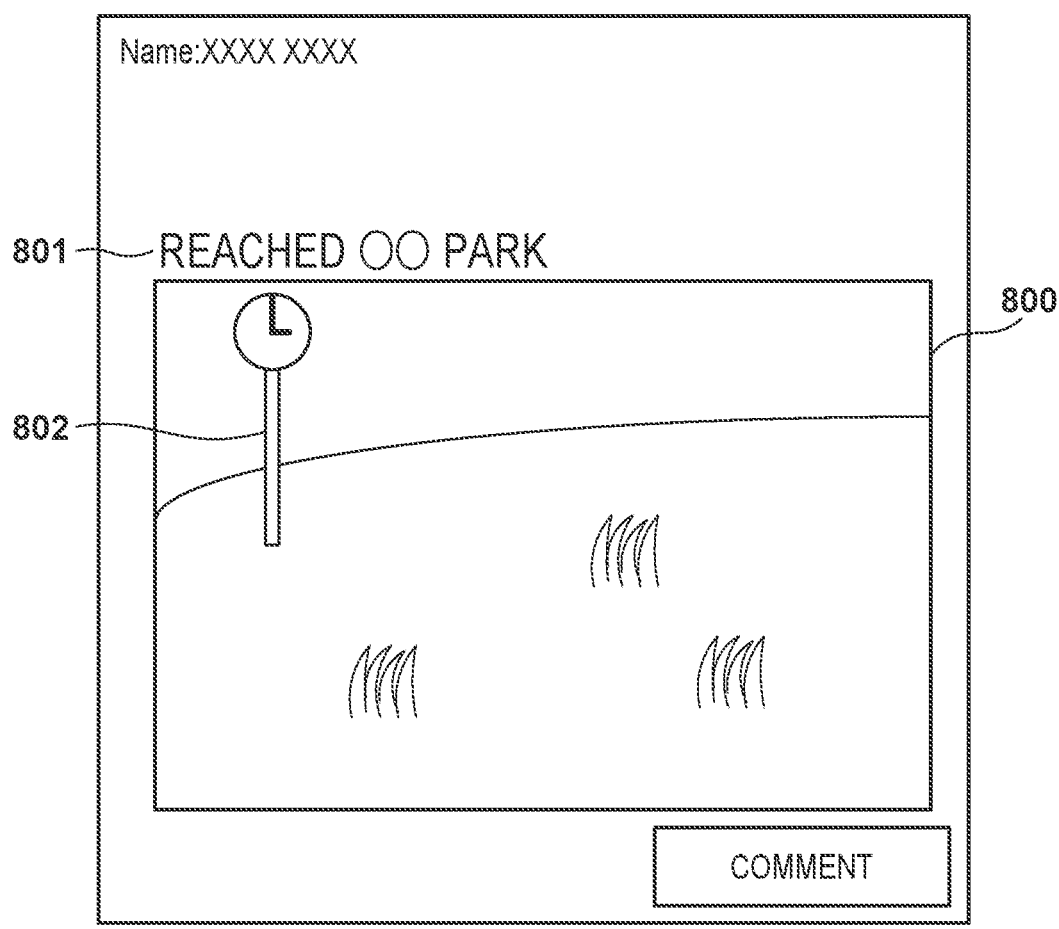
FIG. 7 is a diagram illustrating an example of posting to a social network service (SNS)

In the above embodiment, the information regarding the work result is acquired from the camera 8 installed in the work region 10. However, the method of acquiring the information regarding the work result may be another method. For example, the processing unit 21 may acquire the information regarding the work result based on information such as an image, text, or the like of the work region 10 posted on a predetermined SNS. In one embodiment, the processing unit 21 may be connected to a predetermined SNS server via the Internet or the like and may acquire an image or the like of the work region 10 from the SNS server. FIG. 7 is a diagram illustrating an example of posting to an SNS. The processing unit 21 may request the SNS server to send data of an image 800 whose associated position information indicates the work region 10 or the periphery thereof among the images posted on the SNS. In addition, the processing unit 21 may determine that the image 800 corresponds to the work region 10 or the periphery thereof based on the content of the text 801 posted together with the image 800 and request the SNS server to send data of the image 800. For example, the processing unit 21 may determine that the image 800 corresponds to the work region 10 or the periphery thereof in a case where the text 801 includes the name or the like of the facility where the work region 10 is located. In addition, the processing unit 21 may determine the detailed position of the place captured in the image 800 by extracting a fixed object 802 and the like displayed in the image 800 with respect to the image 800 acquired in this manner. In addition, the processing unit 21 may acquire the content itself of the text 801 as the information regarding the work result. For example, in a case where the text 801 includes a word such as "lawn is growing", "dirty", and the like, these pieces of information may be used as evaluation materials for the work result.

In addition, as a further example of the method of acquiring the information regarding the work result, it is possible to ask an administrator of a facility or the like in which the work region 10 is provided to capture an image of the work region 10 and transmit the image to the information processing apparatus 2.

In addition, in the above embodiment, feedback is performed on the work of the extracted partial region 1011 and the like, but comprehensive evaluation and feedback may be performed on the entire work region 10. For example, in some cases, the work in the work region 10 may be performed by a plurality of work machines and workers by a contractor A at one time and may be performed by a work machine and a worker by a contractor B at another time. In such a case, the partial region 1011 and the like may be extracted, and not only feedback may be performed on the work of that portion, but also evaluation on the entire work of the contractor A, evaluation on the entire work of the contractor B, and the like may be performed. As a result, a comprehensive evaluation result of the work by the contractor or the like can be acquired, so that it is possible to select the contractor, determine the reward to the contractor, and the like more effectively. Note that the comprehensive evaluation may be performed by, for example, the number of partial regions 1011 and the like extracted in one operation.

In addition, in the above embodiment, the work machine 4 is a lawn mower, but the work machine 4 may be another work machine such as a tiller, a snowplow, or the like. For example, in a case where the work machine 4 is a snowplow, the evaluation of the work can be performed based on a result or the like whether or not snow remains in the work region 10.

Figure 8:
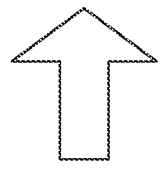
FIG. 8 is a diagram illustrating an example of changing a work frequency.

In addition, in the above embodiment, the processing unit 21 causes to change the operating parameter in S108, but the processing unit 21 may change the work frequency in S108. For example, the processing unit 21 may set a work frequency of a region extracted as the partial region 1011 and the like to be higher than a work frequency of a region that is not the partial region 1011 and the like. As a specific example, in the case of performing work twice, the processing unit 21 may set only the partial region 1011 and the like as a work target in either one of the work. FIG. 8 is a diagram illustrating an example of changing the work frequency in the work region 10. As illustrated in FIG. 8, the processing unit 21 may increase the work frequency of the partial region 1011 and the like by adding work of only the partial region 1011 and the like between the original work schedules. In addition, the processing unit 21 may increase the work frequency of the partial region 1011 and the like by changing work on a day (for example, July 8) scheduled to be performed on the entire region of the work region 10 to work only on the partial region 1011 and the like.

Note that the processing unit 21 may make the number of times of passing through the partial region 1011 and the like in one operation larger than the number of times of passing through other regions. That is, the work frequency of the partial region 1011 and the like may be relatively increased by changing the movement route of the work machine 4 in one operation.

In addition, in the above embodiment, a portion once evaluated to be outside the allowable range is extracted as the partial region 1011 and the like, but only a portion evaluated to be outside the allowable range a plurality of times or a portion evaluated to be outside the allowable range at a certain frequency or more may be extracted as the partial region 1011 and the like. For example, it is assumed that work in the work region 10 is periodically performed, and evaluation of the work is performed based on the flowchart of FIG. 4 after each work. In this case, although a certain region in the work region 10 is basically evaluated as being within the allowable range every time, it is conceivable that the certain region happens to be evaluated as being outside the allowable range due to the influence of the accuracy or the like of the information acquired in S101. In such a case, the processing unit 21 may change or the like an operating parameter unnecessarily. Therefore, by extracting a portion evaluated to be outside the allowable range over a plurality of times or evaluated to be outside the allowable range at a certain frequency or more as the partial region 1011 and the like, it is possible to change or the like the operating parameter with respect to a region for which the feedback of work is highly required.

SUMMARY OF EMBODIMENTS

The above embodiment discloses at least the following information processing apparatus, work management system, and work management method.

1. The information processing apparatus according to the above embodiment is an information processing apparatus (for example, 2) configured to manage work performed in a work region, the information processing apparatus including an acquisition unit (for example, 21, S101) configured to acquire information regarding a work result of the work region, an evaluation unit (for example, 21, S102) configured to evaluate work performed in the work region based on the information acquired by the acquisition unit, and an identifying unit (for example, 21, S105) configured to identify a work subject (for example, 4, 5) that has performed work in a region for which an evaluation is performed by the evaluation unit.

According to this embodiment, it is possible to associate the evaluation result by the evaluation unit with the work subject. Therefore, since the evaluation for the work can be fed back for each work subject, it is possible to improve the quality of the work to be managed.

2. According to the above embodiment, the work subject identified by the identifying unit is a work machine (for example, 4), and the information processing apparatus further includes a first parameter changing unit (for example, 21, S108) configured to change an operating parameter of the work machine in a case where an evaluation by the evaluation unit includes an evaluation that a work result is outside an allowable range.

According to this embodiment, since the operating parameter of the work machine is changed according to the evaluation of the work, it is possible to improve the quality of the work by the work machine.

3. According to the above embodiment, the work subject identified by the identifying unit is a worker (for example, 5), and the information processing apparatus further includes a notification unit (for example, 21, S107) configured to issue a notification regarding work of the worker in a case where an evaluation by the evaluation unit includes an evaluation outside an allowable range.

According to this embodiment, since a notification regarding the work is issued to the worker, the worker can perform the subsequent work based on the content of the notification, and it is possible to improve the quality of the work by the worker.

4. According to the above embodiment, an extraction unit (for example, 21, S104) configured to extract, from the work region, a partial region for which evaluation by the evaluation unit is an evaluation outside an allowable range is further included.

According to this embodiment, since the partial region for which evaluation is the evaluation outside the allowable range is extracted, it is possible to grasp which work of the work performed by the work subject is evaluated outside the allowable range.

5. According to the above embodiment, the work subject identified by the identifying unit is a work machine, and the information processing apparatus further includes a second parameter changing unit (for example, 21, S108) configured to change an operating parameter of the work machine such that the operating parameter of the work machine in the partial region extracted by the extraction unit is different from an operating parameter of the work machine in a region that is not the partial region.

According to this embodiment, since the operating parameter is changed only for the extracted partial region, it is possible to change the operation of the work machine in the region evaluated to be outside the allowable range while maintaining the operation of the work machine in the other region as it is.

6. According to the above embodiment, the work subject identified by the identifying unit is a work machine, and the information processing apparatus further includes a work frequency changing unit (for example, 21) configured to change a work frequency of the work machine so that the work frequency of the work machine in the partial region extracted by the extraction unit becomes higher than the work frequency of the work machine in a region that is not the partial region.

According to this embodiment, since the frequency of the region evaluated to be outside the allowable range increases, it is possible to improve the finish as a whole.

7. According to the above embodiment, the work subject identified by the identifying unit is a worker, and the information processing apparatus further includes a determination unit (for example, S204) configured to determine a reward for the worker based on an evaluation result of the evaluation unit.

According to this embodiment, since the reward for the worker is determined based on the evaluation result, it is possible to enhance the motivation of the worker.

8. According to the above embodiment, the acquisition unit acquires the information regarding the work result based on the image of the work region.

According to this embodiment, it is possible to acquire information regarding the work result by using the image of the work region.

9. According to the above embodiment, the acquisition unit acquires the information regarding the work result based on an image captured by a camera (for example, 8) provided so as to be able to image the work region.

According to this embodiment, it is possible to manage work without providing a camera or the like in the work machine itself 10. According to the above embodiment, the acquisition unit acquires the information regarding the work result based on an image (for example, 800) of the work region posted on a predetermined SNS.

According to this embodiment, it is possible to manage work without installing a camera or the like in the periphery of the work region or providing a camera or the like in the work machine itself.

11. The work management system according to the above embodiment includes an information processing apparatus (for example, 2) configured to manage work performed in a work region, and a communication apparatus (for example, 41, 63) provided in a work subject (for example, 4, 5) that performs work in the work region and configured to be capable of communicating with the information processing apparatus, in which the information processing apparatus includes an acquisition unit (for example, 21, S101) configured to acquire information regarding a work result of the work region, an evaluation unit (for example, 21, S102) configured to evaluate work performed in the work region based on the information acquired by the acquisition unit, and an identifying unit (for example, 21, S105) configured to identify the communication apparatus provided in the work subject that has performed work in a region for which an evaluation is performed by the evaluation unit.

According to this embodiment, it is possible to associate the evaluation result by the evaluation unit with the work subject. Therefore, since the evaluation for the work can be fed back for each work subject, it is possible to improve the quality of the work to be managed.

12. The work management method according to the above embodiment is a work management method for managing work performed in a work region, the work management method including acquiring (for example S101) information regarding a work result of the work region, evaluating (for example S102) work performed in the work region based on the information acquired by the acquisition unit, and identifying (for example S105) a work subject that has performed work in a region for which an evaluation is performed by the evaluation unit.

According to this embodiment, it is possible to associate the evaluation result in the evaluation step with the work subject. Therefore, since the evaluation for the work can be fed back for each work subject, it is possible to improve the quality of the work to be managed.

The invention is not limited to the foregoing embodiments, and various variations/changes are possible within the spirit of the invention.

What is claimed is:

1. An information processing apparatus configured to manage work performed in a work region, the information processing apparatus comprising a processor and a storage device which stores a program, the processor, by executing the program, performing:

acquiring an image of the work region in which a work has been finished;

evaluating condition of the work region after the work based on the image of the work region acquired in the acquiring; and identifying a work subject that has performed the work in the work region for which the evaluating is performed, wherein in the identifying, action histories of work subjects are acquired, and the work subject that has performed the work is identified among the work subjects based on the action histories acquired, or assigned regions of work subjects which are set in advance in a work plan are acquired, and the work subject that has performed the work is identified among the work subjects based on the assigned regions acquired.

2. The information processing apparatus according to claim 1, wherein the work subject identified in the identifying is a work machine, and the processor further performs changing an operating parameter of the work machine in a case where an evaluation result in the evaluating is outside an allowable range.

3. The information processing apparatus according to claim 1, wherein the work subject identified in the identifying is a worker, and the processor further performs issuing a notification regarding a work of the worker in a case where an evaluation result in the evaluating is outside an allowable range.

4. The information processing apparatus according to claim 1, wherein the processor further performs extracting, from the work region, a partial region for which an evaluation result in the evaluating is outside an allowable range.

5. The information processing apparatus according to claim 4, wherein
the work subject identified in the identifying is a work machine, and
the processor further performs changing an operating parameter of the work machine such that the operating parameter of the work machine in the partial region extracted in the extracting is different from an operating parameter of the work machine in a region that is not the partial region.

6. The information processing apparatus according to claim 4, wherein
the work subject identified in the identifying is a work machine, and
the processor further performs changing a work frequency of the work machine so that the work frequency of the work machine in the partial region extracted in the extracting becomes higher than the work frequency of the work machine in a region that is not the partial region.

7. The information processing apparatus according to claim 1, wherein
the work subject identified in the identifying is a worker, and
the processor further performs determining a reward for the worker based on an evaluation result in the evaluating.

8. The information processing apparatus according to claim 1, wherein the image is captured by a camera provided so as to be able to image the work region.

9. The information processing apparatus according to claim 1, wherein the image of the work region is posted on a predetermined social networking service (SNS).

10. A work management system comprising:
an information processing apparatus configured to manage work performed in a work region; and
communication apparatuses provided in work subjects that perform work in the work region and configured to be capable of communicating with the information processing apparatus, wherein
the information processing apparatus includes a processor and a storage device which stores a program, the processor, by executing the program, performing:
acquiring an image of the work region in which a work has been finished;
evaluating condition of the work region after the work based on the image of the work region acquired in the acquiring; and
identifying a communication apparatus, among the communication apparatuses, provided in a work subject that has performed the work in the work region for which the evaluating is performed,
wherein in the identifying, action histories of work subjects are acquired, and the work subject that has performed the work is identified among the work subjects based on the action histories acquired, or assigned regions of work subjects which are set in advance in a work plan are acquired, and the work subject that has performed the work is identified among the work subjects based on the assigned regions acquired.

11. A work management method for managing work performed in a work region, the work management method comprising:
acquiring an image of the work region in which a work has been finished;
evaluating condition of the work region after the work based on the image of the work region acquired in the acquiring; and
identifying a work subject that has performed the work in the work region for which the evaluating is performed,
wherein in the identifying, action histories of work subjects are acquired, and the work subject that has performed the work is identified among the work subjects based on the action histories acquired, or assigned regions of work subjects which are set in advance in a work plan are acquired, and the work subject that has performed the work is identified among the work subjects based on the assigned regions acquired.

12. A non-transitory computer-readable storage medium storing a program for causing a computer to perform a work management method for managing work performed in a work region, the work management method comprising:
acquiring an image of the work region in which a work has been finished;
evaluating condition of the work region after the work based on the image of the work region acquired in the acquiring; and
identifying a work subject that has performed the work in the work region for which the evaluating is performed,
wherein in the identifying, action histories of work subjects are acquired, and the work subject that has performed the work is identified among the work subjects based on the action histories acquired, or assigned regions of work subjects which are set in advance in a work plan are acquired, and the work subject that has performed the work is identified among the work subjects based on the assigned regions acquired.

* * * * *